United States Patent [19]

Palmer

[11] Patent Number: 4,832,931
[45] Date of Patent: May 23, 1989

[54] SYNTHESIS OF TETRAFLUOROHYDRAZINE

[75] Inventor: Miles R. Palmer, Herndon, Va.

[73] Assignee: The United States of America as represented by the Secretary of the Air Force, Washington, D.C.

[21] Appl. No.: 241,179

[22] Filed: Sep. 7, 1988

[51] Int. Cl.$^4$ .............................................. C01B 21/52
[52] U.S. Cl. ..................................... 423/406; 423/342
[58] Field of Search ................................ 423/406, 342

[56] References Cited

U.S. PATENT DOCUMENTS

| | | | |
|---|---|---|---|
| 3,085,862 | 4/1963 | Atadan et al. | 23/203 |
| 3,122,416 | 2/1964 | Gould et al. | 423/406 |
| 3,181,305 | 5/1965 | Schoenfelder | 62/12 |
| 3,214,237 | 10/1965 | Morrow | 423/406 |
| 3,220,799 | 11/1965 | Colburn | 23/205 |
| 3,220,800 | 11/1965 | Martin | 23/205 |
| 3,254,944 | 6/1966 | Lawton et al. | 23/14 |
| 3,304,248 | 2/1967 | Fullam et al. | 204/178 |
| 3,356,454 | 12/1967 | Tompkins, Jr. et al. | 23/190 |
| 3,472,634 | 10/1969 | Marshall et al. | 23/356 |
| 3,506,401 | 4/1970 | Marshall et al. | 23/205 |
| 3,961,024 | 6/1976 | Vitek | 423/406 |

FOREIGN PATENT DOCUMENTS

| | | | |
|---|---|---|---|
| 653984 | 12/1962 | Canada | 423/406 |
| 765757 | 8/1967 | Canada | 423/406 |
| 1138382 | 10/1962 | Fed. Rep. of Germany | 423/406 |
| 1147204 | 4/1963 | Fed. Rep. of Germany | 423/406 |
| 1444536 | 8/1965 | France | 423/406 |
| 895943 | 5/1962 | United Kingdom . | |

OTHER PUBLICATIONS

Colburn, C. B., "Communications to the Editor," unknown, vol. 80, p. 5004.
Lawless, E. W. and Smith, I. C., "Fluoronitrogen Compounds," *Inorganic High–Energy Oxidizers*, Marcel Dekker, NY, 1968, pp. 48–53.

Primary Examiner—John Doll
Assistant Examiner—Wayne A. Langel
Attorney, Agent, or Firm—Donald J. Singer; Stanton E. Collier

[57] ABSTRACT

High purity tetrafluorohydrazine is synthesized by reacting NF$_3$ with silicon at an elevated temperature. The reaction occurs only periodically and at a low concentration of NF$_3$. Immediate cooling of the reaction material produces tetrafluorohydrazine and SiF$_4$. Alkaline hydrolysis removes substantially all impurities. Tetrafluorohydrazine is further recovered by cryogenic trapping from the remaining impurities.

6 Claims, 1 Drawing Sheet

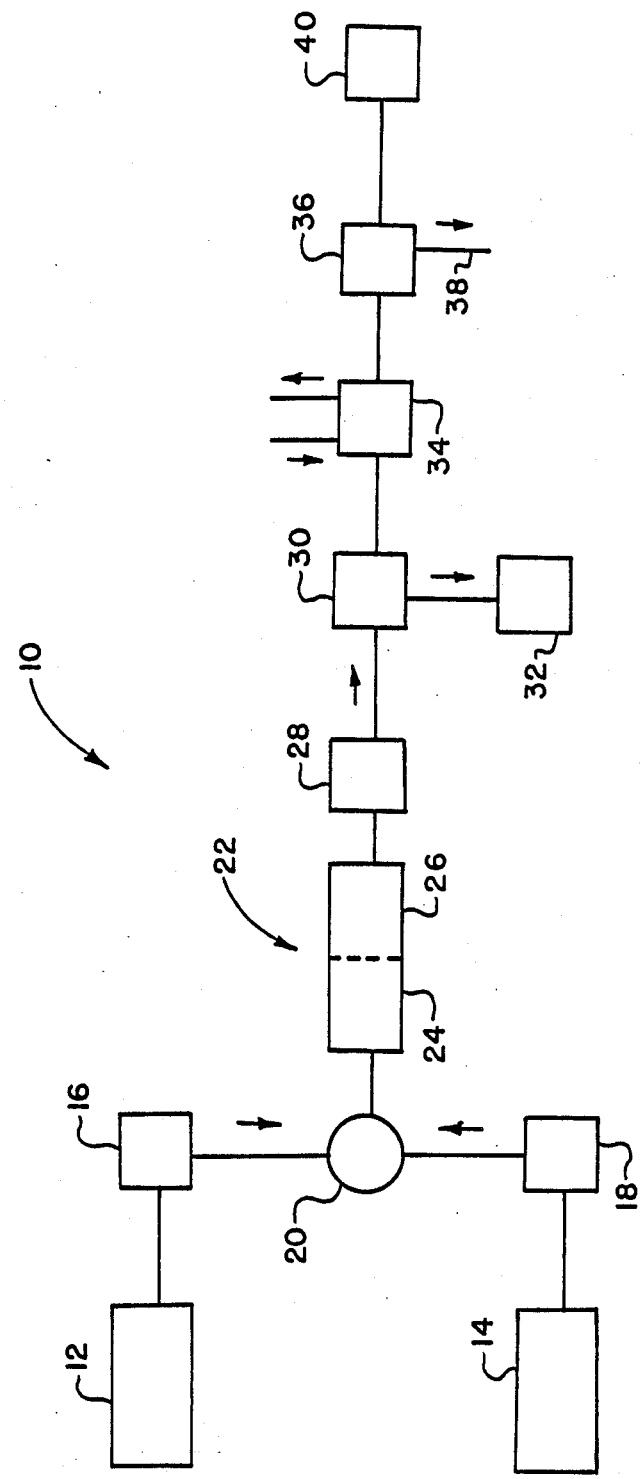

SYNTHESIS OF TETRAFLUOROHYDRAZINE

STATEMENT OF GOVERNMENT INTEREST

The invention described herein may be manufactured and used by or for the Government for governmental purposes without the payment of any royalty thereon.

BACKGROUND OF THE INVENTION

The present invention relates to the synthesis of tetrafluorohydrazine and, in particular, to a single step process where impurities are easily removed.

One of the prior processes of producing tetrafluorohydrazine reacted nitrogen trifluoride with carbon at an elevated temperature to produce a yield of about 75 percent but the reaction products included $N_2$, NO, $N_2O$ and fluorocarbons. Separating these undesirable products from tetrafluorohydrazine has been very difficult. U.S. Pat. No. 3,356,454 is incorporated by reference.

Another process involves heating nitrogen trifluoride to an elevated temperature in the presence of a reactive metal surface and then separating the tetrafluorohydrazine. The formation of fluorides on the metal surfaces causes this process to be difficult to control. U.S. Pat. No. 3,220,799 is incorporated by reference.

Another process involved the reaction of nitrogen trifluoride with nitric oxide (NO). Some of the products are nitrogen oxyfluorides which are extremely corrosive and difficult to remove. Traces of these impurities may sensitize tetrafluorohydrazine to detonation thus making the end product undesirable as a rocket fuel.

Tetrafluorohydrazine is useful as a high energy oxidizer as a rocket propellant. For example, when it reacts with hydrazine a specific impulse of about 300 is possible. This value may be compared with those for reaction of oxygen and hydrazine, for which the calculated specific impulse is 273 sec. and the flame temperature is 3000° K. It will be seen that tetrafluorohydrazine provides almost as high a specific impulse, but it differs from oxygen in being storable in liquid condition at normal temperatures, while liquid oxygen requires low temperatures which bring many problems.

Tetrafluorohydrazine can also be reacted with ammonia to provide a source of high energy and high impulse. Thus, tetrafluorohydrazine may be stored in missiles which are ready for immediate launching.

The present invention is directed at a single step process that produces tetrafluorohydrazine without these undesirable characteristics.

SUMMARY OF THE INVENTION

The present invention provides a process which synthesizes tetrafluorohydrazine with other products that are easily removed to leave a high purity tetrafluorohydrazine.

The basic reactions that yielded tetrafluorohydrazine are as follows:

$$4 NF_3 + Si \rightarrow 4 NF_2 + SiF_4 \quad (1)$$

$$4 NF_2 + SiF_4 \rightarrow 2 N_2F_4 + SiF_4 \quad (2)$$

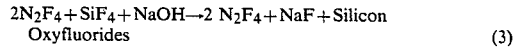

$$2N_2F_4 + SiF_4 + NaOH \rightarrow 2 N_2F_4 + NaF + \text{Silicon Oxyfluorides} \quad (3)$$

Therefore, one object of the present invention is to provide a process to synthesize tetrafluorohydrazine with impurities that are easily separable from tetrafluorohydrazine.

Another object of the present invention is to provide a process to synthesize tetrafluorohydrazine with impurities that are not corrosive or explosive but which are easily separable from tetrafluorohydrazine.

Another object of the present invention is to provide a process to produce a rocket propellant without explosive impurities therein.

Another object of the present invention is to provide a process for synthesizing tetrafluorohydrazine without coboiling corrosive or explosive impurities.

These and many other objects and advantages of the present invention will be readily apparent to one skilled in the pertinent art from the following detailed description of a preferred embodiment of the invention and the related drawings.

BRIEF DESCRIPTION OF THE DRAWINGS

The only FIGURE is a schematic illustration of the apparatus to synthesize high purity tetrafluorohydrazine.

DETAILED DESCRIPTION OF THE PREFERRED EMBODIMENT

Referring to the only FIGURE, a schematic of a synthesis apparatus 10 is shown that employs the process of the present invention.

As seen therein, a diluent source 12 having helium outputs the helium to a controllable valve 16. A gas source 14 of $NF_3$ outputs $NF_3$ to a controllable valve 18. A mixing chamber 30 combines the helium and $NF_3$ such that the $NF_3$ is at about 3 percent concentration by volume in a resulting mixture entering a reactor 22. The resulting mixture is input at a pressure of about 850 Torr and at a flow rate of about 3000 SCCM (standard cubic centimeters per minute).

Reactor 22 has a heating zone 24 and a cooling zone 26 and is a nickel tube. The heating zone 24 is approximately 40 centimeters in length with a diameter of about 7 millimeters. It is heated to a temperature of about 275 degrees Centigrade. The heating zone 24 is filled with chips of silicon and, in this example, has about 32 grams of granules in the 0.4 to 1.0 millimeters size range. The cooling zone 26 has a temperature of about 25 to 50 degrees Centigrade. The reaction as described in equation 1 occurred in the heating zone 24.

To prevent overheating in the heating zone 24 the reactant mixture flow was pulsed on and off with a 200 second period and a 15 percent duty cycle. During the non-duty cycle, pure helium at a flow rate of about 3000 SCCM was flowing through reactor 20. This flow was achieved by operation of controllable valves 16 and 18.

The $NF_2$ and $SiF_4$ resulting from the heating of $NF_3$ with Si was cooled in the cooling zone 26 and this resulted in the reaction as described by equation 2.

The cooling was in a range from about 25 to 50 degrees Centigrade.

The cooled product, tetrafluorohydrazine and $SiF_4$ was then filtered by a filter 28 being a 15 micron stainless steel filter.

The residual starting materials He and $NF_3$, remaining in the filtered product are separated by a cryogenic trap 30 into a collector 32. Trap 30 operated at liquid nitrogen temperature at a flow pressure of about 150 Torr.

The output of trap 30 was washed in a basic condition scrubber 34 which carried out the reaction as described by equation (3) above. Scrubber 34 has therein a 10 percent sodium hydroxide water solution. The washing occurred for about 15 seconds at room temperature. The output of scrubber 34 being tetrafluorohydrazine and other impurities such as $N_2O$ and $NF_3$ was input to another cryogenic trap 36. High purity tetrafluorohydrazine was collected at output 38 of trap 36 and other residuals collected in container 40.

The washed produce was shown to be greater than 80 percent pure tetrafluorohydrazine with only $N_2O$ and $NF_3$ remaining therein by gravimeter and infrared analysis.

Clearly many modifications and variations of the present invention are possible in light of the above teachings and it is therefore understood, that within the inventive scope of inventive concept, the invention may be practiced otherwise than specifically claimed.

What is claimed is:

1. A process for synthesizing high purity tetrafluorohydrazine, said process comprising the steps of:
   a. controllably mixing $NF_3$ with a diluent gas to form a starting mixture;
   b. selectively reacting the starting mixture with silicon at an elevated temperature to form $NF_2$ and $SiF_4$ in a reaction flow;
   c. cooling the reaction flow to form tetrafluorohydrazine therein, said tetrafluorohydrazine being mixed with $SiF_4$ and other impurities;
   d. filtering the reaction flow;
   e. removing substantially all of the diluent gas and $NF_3$ from the reaction flow by use of a first cold trap;
   f. scrubbing the reaction flow with a basic solution to substantially remove $SiF_4$; and
   g. recovering high purity tetrafluorohydrazine from the reaction flow by use of a second cold trap.

2. A process as defined in claim 1, step a, wherein $NF_3$ comprises about 3 percent concentration by volume with helium being the diluent gas in said starting mixture.

3. A process as defined in claim 1, step b, wherein the starting mixture is reacted with silicon at a temperature of about 275 degrees Centigrade.

4. A process as defined in claim 3 wherein the starting mixture is reacted with the silicon periodically about 15 percent of the time.

5. A process as defined in claim 1, step c, wherein the cooling occurs in a range of from about 25 to 50 degrees Centigrade.

6. A process as defined in claim 1, step f, further comprising a basic solution being about 10 percent sodium hydroxide and scrubbing occurring for about 15 seconds at about 22 degrees Centigrade.

* * * * *